United States Patent [19]

Adelmann et al.

[11] 4,367,186

[45] Jan. 4, 1983

[54] PROCESS FOR THE PREPARATION OF MODIFIED POLYCARBONATE MOLDING COMPOSITIONS

[75] Inventors: Siegfried Adelmann; Dieter Margotte; Werner Nouverine, all of Krefeld; Frank Kleiner, Cologne, all of Fed. Rep. of Germany

[73] Assignee: Bayer Aktiengesellschaft, Leverkusen, Fed. Rep. of Germany

[21] Appl. No.: 319,532

[22] Filed: Nov. 9, 1981

Related U.S. Application Data

[63] Continuation of Ser. No. 74,597, Sep. 12, 1979, abandoned.

[30] Foreign Application Priority Data

Sep. 27, 1978 [DE] Fed. Rep. of Germany ....... 2842004

[51] Int. Cl.$^3$ ............................................. C08J 3/28
[52] U.S. Cl. .................. 264/22; 204/159.14; 204/159.18
[58] Field of Search ............ 204/159.14, 159.18; 264/22

[56] References Cited

U.S. PATENT DOCUMENTS

| 3,043,802 | 7/1962 | Thoma et al. ................. 260/47 |
| 3,124,554 | 3/1964 | Schnell et al. ................. 525/468 |
| 3,150,066 | 9/1964 | Schnell et al. ................. 204/159.4 |
| 3,164,564 | 1/1965 | Butterworth et al. ............ 525/468 |
| 3,652,715 | 3/1972 | Holub et al. ................... 204/159.4 |
| 3,692,870 | 9/1972 | Schnell et al. ................. 525/468 |
| 3,879,348 | 4/1975 | Serini et al. .................. 260/48 |
| 4,129,612 | 12/1978 | Serini et al. .................. 528/202 |
| 4,199,540 | 4/1980 | Adelmann et al. .............. 264/22 |
| 4,212,774 | 7/1980 | Idel ............................ 260/213 |

FOREIGN PATENT DOCUMENTS

| 2057274 | 5/1972 | Fed. Rep. of Germany . |
| 2757086 | 12/1977 | Fed. Rep. of Germany . |
| 1062105 | 3/1967 | United Kingdom . |

OTHER PUBLICATIONS

The Condensed Chemical Dictionary, Ninth Edition, p. 856 revised by Gessner G. Hawley.
P. 62 of the Schnell monograph–Chemistry and Physics of Polycarbonates by H. Schnell.

Primary Examiner—John C. Bleutge
Assistant Examiner—A. H. Koeckert
Attorney, Agent, or Firm—Gene Harsh; Lawrence S. Pope; Aron Preis

[57] ABSTRACT

This development is concerned with an improved process of preparing polycarbonate molding compositions and molded articles having superior hydrolysis resistance, stress crack resistance and flame retardancy, by thermoplastically processing a partially crosslinked aromatic polycarbonate. A crosslinkable aromatic thermoplastic polycarbonate is subject to irradiation to cause crosslinking on its surface such that between about 5 and 50 wt. % of the polymer is crosslinked and it is then thermoplastically processed. This partially crosslinked polycarbonate may be blended with un-crosslinked thermoplastic aromatic polycarbonate or known flame retardant agents. This development is also concerned with the compositions or articles so produced.

12 Claims, No Drawings

PROCESS FOR THE PREPARATION OF MODIFIED POLYCARBONATE MOLDING COMPOSITIONS

This application is a continuation of application Ser. No. 74,597, filed Sept. 12, 1979, now abandoned.

SUMMARY OF THE INVENTION

The present invention relates to a process for the preparation of modified thermoplastic polycarbonate molding compositions, which is characterized in that crosslinkable thermoplastic, aromatic polycarbonates are crosslinked on the surface in a known manner by irradiation with high-energy rays, before or after being granulated, and are then processed as thermoplastics. The molding compositions should contain about 5–50% by weight, preferably about 10–30% by weight, of crosslinked polycarbonate relative to the total weight of non-crosslinked and crosslinked polycarbonate.

The molding compositions according to the invention can optionally also contain flameproofing agents, which are admixed either before or after the irradiation, in amounts of 0.05–5% by weight, preferably 0.1–2% by weight, relative to the weight of the total mixture.

DETAILED DESCRIPTION OF THE INVENTION

The modified polycarbonate molding compositions obtainable according to the invention are distinguished by a favorable pattern of properties, since they contain a variable proportion of incorporated crosslinked polycarbonates. Moreover, their pattern of properties can be further varied by the addition of the most diverse additives. Suitable additives are both high-molecular polymers which can be processed as thermoplastics and low-molecular orangic or inorganic compounds.

Thermoplastic, aromatic polycarbonates which can be crosslinked according to the present invention by means of UV rays and/or other high-energy rays are known (see, for example, DOS (German Published Specification) No. 2,063,050 and U.S. Pat. No. 3,879,348 incorporated by reference herein; DOS (German Published Specification) No. 2,615,038 and U.S. Pat. No. 4,129,612 incorporated herein by reference; German patent specification No. 1,221,012 and DOS (German Published Specification) No. 1,595,703; or they are described in the following German Patent Application Nos.: P 27 46 139.8; P 27 46 140.1; and P 27 46 141.2 as well as in U.S. patent application Ser. No. 34,839 filed April 30, 1979; Ser. No. 945,150 filed Sept. 22, 1978 and Ser. No. 945,149 filed Sept. 22, 1978. Accordingly, polycarbonates which can be crosslinked by UV rays or other high-energy rays must contain either co-condensed alkenyl groups or co-condensed labile C—H bonds or co-condensed benzophenone structures in order for them to be crosslinked on their surface, more or less intensively as required, if appropriate, after adding photo-initiators and, if appropriate, after adding photo-reducing agents and, if appropriate, sensitizer. Detailed additional explanations can be found in the German Patent Applications mentioned in the following texts: Nos. P 27 46 139.8; P 27 46 140.1 and P 27 46 141.2 and German Patent Application Nos. P 28 29 258.2; P 28 29 257.1 and P 28 29 256.0 as well as in U.S. patent application Ser. No. 34,839 filed Apr. 30, 1979; Ser. No. 945,150 filed Sept. 22, 1978 and Ser. No. 945,149 filed Sept. 22, 1978; and Ser. No. 50,899 filed June 21, 1979 which now is U.S. Pat. No. 4,221,645.

Thermoplastic, aromatic polycarbonates of this type which can be crosslinked by UV rays or other high-energy rays are built up by reacting aromatic diphenols and phosgene by known processes, for example, the two-phase boundary process; see, for example, U.S. Pat. No. 3,028,365, incorporated herein by reference, and the monograph "H. Schnell, Chemistry and Physics of Polycarobonates, Interscience Publishers, New York, 1964".

Thermoplastic, aromatic polycarbonates of this type which can be crosslinked by UV rays of other high-energy rays should have weight average molecular weights $\overline{M}w$ between about 10,000 and 200,000 preferably between about 20,000 and 80,000 (measured by light scattering).

Sources of energy used are commerically available UV lamps, for example Philips HTQ 4 or 7, Hanovia lamps and others, or commerically available electron beam curing units, for example the 150 kV electron accelerator system ESH 150 from Messrs. Polymer Physik, Tübingen, or the 320 kV electron accelerator from Messers. Werner und Pfleiderer, Stuttgart. Irradiation is effected under conventional conditions.

The polycarbonates which can be crosslinked on the surface are extruded in a known manner and irradiated, either immediately as the extruded strand or in the form of granules, and are made into any desired shape by means of extrusion or injection-molding.

For the desired molding, the polycarbonate granules, according to the invention, which are crosslinked on the surface are injection-molded under customary processing conditions at material temperatures of about 270–300° C. and mold temperatures of about 85–120° C. in injection-molding machines customary for polycarbonates.

The process according to the invention can be varied by the fact that it is also possible to admix a non-crosslinked thermoplastic, aromatic polycarbonate in the molecular weight range $\overline{M}w$ between about 10,000 and 200,000, preferably between about 20,000 and 80,000, before the thermoplastic processing, the mixture containing about 5–50% by weight, preferably about 10–30% by weight, of crosslinked polycarbonate relative to the total weight of non-crosslinked and crosslinked polycarbonate.

Examples of flameproofing agents suitable for providing the polycarbonate molding compositions obtainable according to the invention with a flameproof finish are the compounds known and suitable for flameproofing polycarbonates, in amounts of about 0.05 to 5% by weight, preferably about 0.1 to 2% by weight, relative to the total weight of polycarbonate, and substances having a synergistic action, such as are described in DT-OS (German Published Specification) No. 1,930,257; DT-OS (German Published Specification) No. 2,049,358; (German Published Specification) No. 2,112,987; DT-OS (German Published Specification) No. 2,253,072; DT-OS (German Published Specification) No. 2,149,311 as well as U.S. Pat. Nos. 3,775,367 and 3,836,490 and other literature references.

Examples of suitable compounds are alkali metal salts of organic and inorganic acids, in particular the alkali metal salts, which are soluble in the polycarbonate, of organic acids, that is to say alkali metal salts of carboxylic acids, such as potassium isooctanate, sodium isooctanate, lithium isooctantate, potassium perfluorooctantate, sodium perfluorooctanate, lithium perfluorooctanate, potassium salts of 5-ethyl-dioxan-1,3-yl-5-carboxylic acid, rubidium isooctanate or rubidium perfluorooctantate, or alkali metal salts of sulphonic acids, such as, for example, alkali metal salts or perfluoroalkanesulphonic acid, such as potassium perfluoromethanesulphonate, potassium perfluorooctanesulphonate and potassium perfluorobutanesulphonate. Moreover, alkali metal salts of lauric acid, stearic acid, and oleic acid, of phthalic acid monobenzyl ester, of adipic acid monobutyl ester, of p-octylbenzoic acid or p.-tert.-butylbenzoic acid, of 3-(3,5-di-tert.-butyl-4-hydroxyphenyl)-propionic acid and of diglycollic acid monodecyl ester can be used.

The polycarbonate molding compositions obtainable according to the invention are distinguished by a good resistance to solvents and resistance to hydrolysis.

Furthermore, in comparison to conventional unmodified polycarbonates, the polycarbonate molding compositions obtainable according to the invention have a significantly increased resistance to stress cracking. On the basis of these advantageous properties, the polycarbonates obtained according to the invention can be used in all cases where good resistance to organic solvents is required in addition to good resistance to hydrolysis and resistance to stress cracking, for example for moldings in the car sector and furniture sector, casings of domestic utensils, for example egg cups and coffee machines, and others.

The improved resistance to hydrolysis is measured with the aid of the impact strength; thus, the impact strength of a test piece, boiled in water, of unmodified polycarbonate after a boiling time of 500 hours falls to 8 kJ/m$^2$, while a polycarbonate test piece modified according to the present invention still has an impact strength of 18 kJ/m$^2$ after a boiling time of 500 hours (see Table 1).

The polycarbonate molding compositions obtained according to the invention are provided with a flame-resistant finish, without the addition of flameproofing agents, but especially after addition thereof, such that they can be employed, for example, as lining for buildings in the construction sector.

Thus, in accordance with UL Subj. 94, a polycarbonate obtainable according to the invention which contains 0.1% by weight of potassium perfluorobutanesulphonate achieves the fire-repellency classification V0 at a sample thickness of 1/16", while an unmodified polycarbonate containing 0.1% by weight of potassium perfluorobutanesulphonate achieves only V2 at the same sample thickness (see Table 2).

To test the resistance to stress cracking, the test pieces were wetted, at a deflection of 10 mm, with the solvent mixture toluene/n-propanol (1:3) and pure carbon tetrachloride and were examined for the formation of cracks. In contrast to test pieces of unmodified polycarbonate, the test pieces of polycarbonate modified according to the invention show no cracks (see Table 2 ).

The examples which follow are intended to illustrate the subject of the invention in more detail. The relative viscosities indicated are measured in methylene chloride at 25° C. and at a concentration of 5 g/l.

The properties of the substances of Example 1-5 are summarized in Tables 1 and 2.

EXAMPLES

EXAMPLE 1 (Comparison Example)

Polycarbonate, prepared using 3.2 mol % of methacrylic acid chloride as a chain stopper A solution is prepared from 3.192 kg (14 mols) of 2,2-bis-(4-hydroxyphenyl)-propane (bisphenol A), 2.53 kg of 45% strength aqueous sodium hydroxide solution and 15 of distilled water. After adding 34 kg of methylene chloride, 52.5 g (about 0.5 mol) of methacrylic acid chloride, dissolved in 1 kg of methylene chloride, are added at room temperature, while stirring. 2.64 kg of phosgene are passed in at 20°-25° C. The pH value is kept at 13-14 during the phosgenation by adding a further 26.3 kg of 6.5% strength sodium hydroxide solution. 15 ml of triethylamine are then added and the mixture is subsequently stirred for 30 minutes. The upper aqueous phase is then separated off and the organic phase is acidified and washed until free from electrolytes. The methylene chloride is then evaporated off from the organic phase at 300° C. via a ZSK machine and the polycarbonate is granulated. The relative solution viscosity is 1.30.

EXAMPLE 2 (Comparison Example)

3,996 g of the polycarbonate from Example 1 are mixed with 4 g (0.1% by weight) of potassium perfluorobutanesulphonate at 300° C. in a twin-screw machine and the mixture is granulated.

EXAMPLE 3

3,820 g of the polycarbonate from Example 1 are mixed with 80 g (2% by weight) of benzophenone and 100 g (2.5 % by weight) of dibenzyl ether, as a photo-reducing agent, at 270° C. in a twin-screw machine and the mixture is granulated. The granules are then irradiated under a Philips HTQ 7 high-pressure mercury vapor lamp for 3 minutes, while turning several times. Thereafter, the proporation of crosslinked insoluble polycarbonate is about 30% by weight.

EXAMPLE 4

3,816 g of the polycarbonate from Example 1 are mixed with 80 g (2% by weight) of benzophenone and 100 g (2.5% by weight) of bidenzyl ether and 4 g (0.1% by weight) of potassium perfluorobutanesulphonate at 270° C. in a twin-screw machine and the mixture is granulated. The granules are then irradiated under a Philips HTQ 7 high-pressure mercury vapor lamp for 3 minutes, while turning several times. As in Example 5, the proporation of crosslinked insoluble polycarbonate is about 30% by weight.

EXAMPLE 5

50 parts by weight of the polycarbonate according to Example 4 with about 30% by weight of crosslinked insoluble polycarbonate and 50 parts by weight of a commercially available polycarbonate, Makrolon 2800, are mixed at 280° C. in a twin-screw machine and the mixture is granulated. The proportion of crosslinked insoluble polycarbonate is thus about 15% by weight.

TABLE 1

| Impact strength kJ/m² DIN 53,453 | Example | | | | |
|---|---|---|---|---|---|
| | 1 | 2 | 3 | 4 | 5 |
| after 100 hours boiling in water | 2 × 95<br>8 × n.b.* | 3 × 90<br>7 × n.b. | n.b. | n.b. | n.b. |
| after 200 hours boiling in water | 26 | 25 | 5 × 75<br>5 × n.b. | 6 × 75<br>4 × n.b. | 6 ×0 70<br>4 × n.b. |
| after 300 hours boiling in water | 21 | 20 | 6 × 50<br>4 × n.b. | 5 × 50<br>5 × n.b. | 6 × 48<br>4 × n.b. |
| after 400 hours boiling in water | 16 | 16 | 30 | 28 | 27 |
| after 500 hours boiling in water | 8 | 7 | 18 | 16 | 15 |
| after 700 hours boiling in water | 8 | 7 | 15 | 15 | 14 |

*n.b. = not broken

TABLE 2

| Burning test according to UL Subj. 94 | ⅛" | 1/16" | Formation of cracks after wetting with | |
|---|---|---|---|---|
| | | | toluene/n-propanol (1:3) | CCl₄DIN |
| Example 1 (Comparison Example) | V2 | V2 | yes | yes |
| Example 2 (Comparison Example) | V0 | V2 | yes | yes |
| Example 3 | V0 | V1 | no | no |
| Example 4 | V0 | V0 | no | no |
| Example 5 | V0 | V0 | no | no |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a modified theremoplastic polycarbonate molding composition, characterized in that a crosslinkable thermoplastic, aromatic polycarbonate is crosslinked on the surface by irradiation with high-energy rays, after being granulated, and is then extruded or injection molded, the proportion of crosslinked polycarbonate being 5–50% by weight, relative to the total weight of non-crosslinked and crosslinked polycarbonate.

2. A process according to claim 1, characterized in that the proportion of crosslinked polycarbonate is about 10–30% by weight, relative to the total weight of non-crosslinked and crosslinked polycarbonate.

3. A process according to claim 1 or 2, characterized in that a flameproofing agent is admixed, either before or after the irradiation, in an amount of about 0.05–5% by weight, relative to the weight of the total mixture.

4. A process according to claim 3, characterized in that the flameproofing agent is admixed in an amount of about 0.1–2% by weight, relative to the weight of the total mixture.

5. A process according to claim 3, characterized in that the flameproofing agent is an alkali metal carboxylate or an alkali metal sulphonate.

6. A process according to claim 1 or 2, characterized in that crosslinking with high-energy rays is carried out and the polycarbonate is then extruded or injection molded.

7. A process according to claim 1 or 2, characterized in that the crosslinking is effected by irradiation with ultra-violet light or with an electron beam.

8. A process according to claim 1 or 2, characterized in that the crosslinkable polycarbonate contains co-condensed alkenyl groups, co-condensed labile C—H bonds or co-condensed benzophenone structures.

9. A process according to claim 1 or 2, characterized in that the crosslinkable polycarbonate has a molecular weight Mw (as measured by light-scattering) of between about 10,000 and 200,000.

10. A process according to claim 9, characterized in that the crosslinkable polycarbonate has a molecular weight Mw (as measured by light-scattering) of between about 20,000 and 80,000.

11. In a process of injection molding aromatic polycarbonate, the improvement comprising molding granules of an aromatic polycarbonate whose surfaces have been crosslinked by irradiation such that between 5 and 50 wt. % of said polycarbonate has been rendered insoluble in normal aromatic polycarbonate solvents, said polycarbonate having a M̄w of between about 20,000 and 80,000 and being wholly thermoplastic before irradiation.

12. In the process of molding by extrusion of aromatic polycarbonate, the improvement comprising molding granules of an aromatic polycarbonate whose surfaces have been crosslinked by irradiation such that between 5 and 50 wt. % of said polycarbonate has been rendered insoluble in normal aromatic polycarbonate solvents, said polycarbonate having a M̄w of between about 20,000 and 80,000 and being wholly thermoplastic before irradiation.

* * * * *